May 2, 1933.          C. S. HADLEY ET AL          1,906,262
GEAR SHIFTING DEVICE
Filed Dec. 14, 1932          2 Sheets-Sheet 1
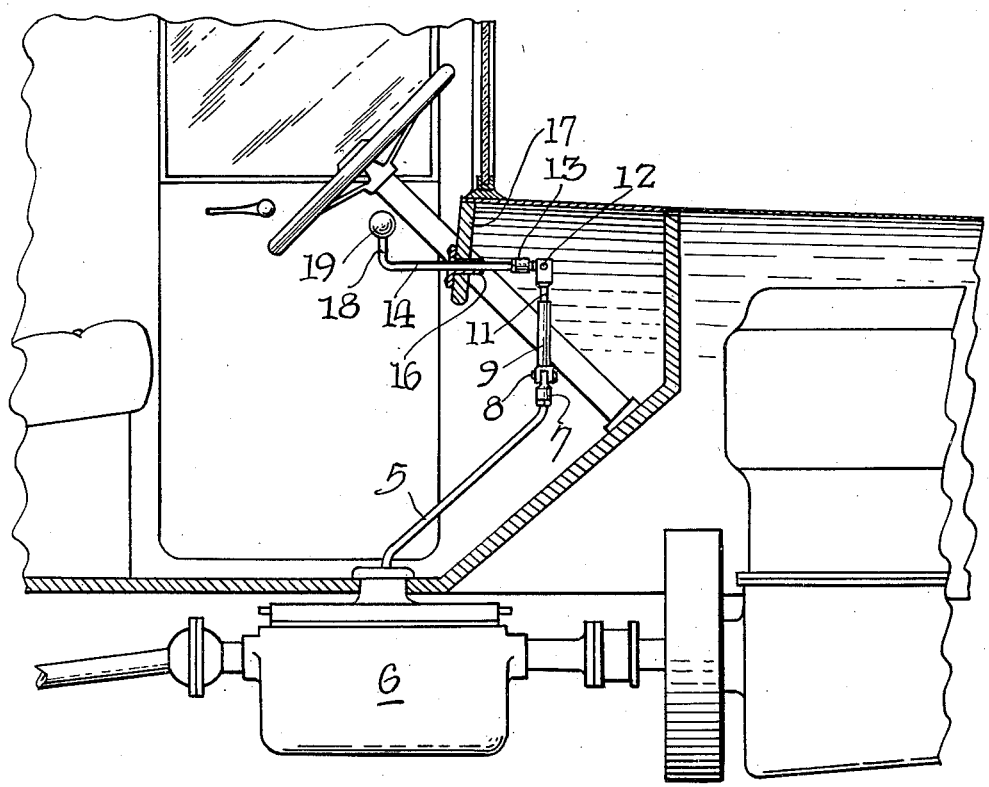
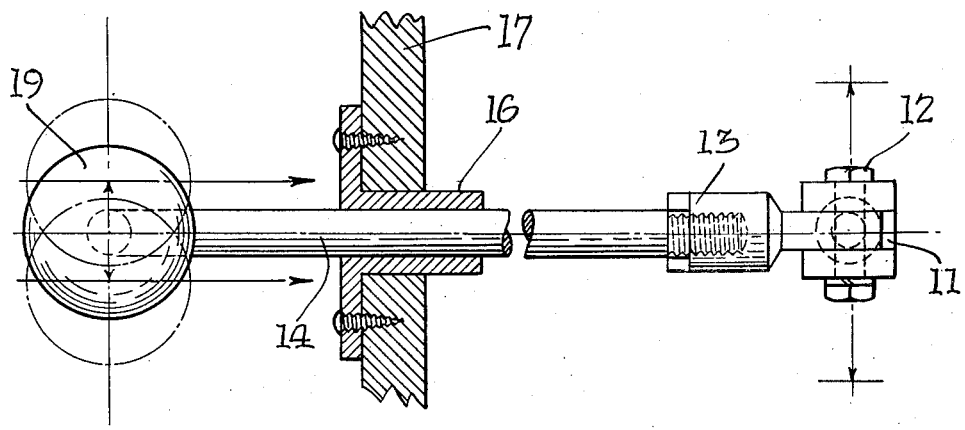
INVENTORS:
CHARLES S. HADLEY
ROBERT W. FISCHER
BY
Victor J. Evans & Co
ATTORNEYS.

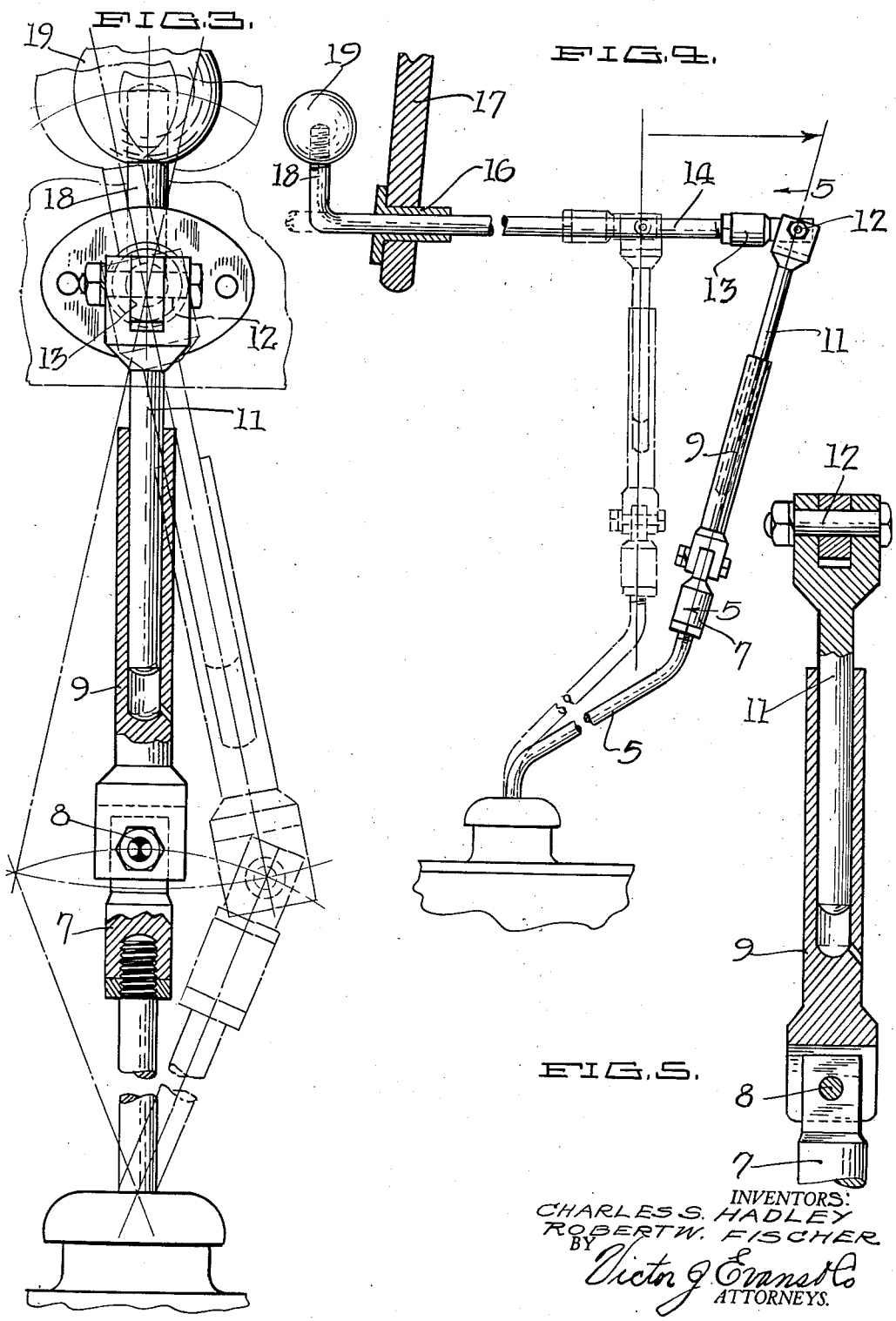

Patented May 2, 1933

1,906,262

UNITED STATES PATENT OFFICE

CHARLES S. HADLEY AND ROBERT W. FISCHER, OF LOS ANGELES, CALIFORNIA, ASSIGNORS, BY DIRECT AND MESNE ASSIGNMENTS, OF ONE-FOURTH TO ROBERT W. FISCHER, ONE-EIGHTH TO PERCY R. FULLINWIDER, AND ONE-EIGHTH TO ELMER E. HILL, ALL OF LOS ANGELES, CALIFORNIA

GEAR SHIFTING DEVICE

Application filed December 14, 1932. Serial No. 647,246.

This invention relates to improvements in gear shifting devices and has particular reference to means for operating the transmission of a motor vehicle.

A further object is to produce a device which may be employed with the ordinary transmission now in use.

A further object is to produce a device which is economical to manufacture and one which may be attached to the ordinary car without involving any material changes in its construction.

A further object is to produce a device which eliminates a large amount of movement to effect the changing of gear ratios.

A still further object is to produce a device which is mechanically strong and therefore one which will not become easily deranged.

An additional object is to place the gear shifting action in a convenient location with respect to the driver's hands.

Other objects and advantages will be apparent during the course of the following description.

In the accompanying drawings forming a part of this specification and in which like numerals are employed to designate like parts throughout the same, Fig. 1 is a fragmentary view of a motor vehicle shown partly in cross section and having our invention applied thereto, Fig. 2 is an enlarged top plan view of the operating lever, Fig. 3 is an enlarged end elevation looking from a point adjacent the engine, Fig. 4 is an enlarged side elevation showing the in and out positions of the lever, and Fig. 5 is an enlarged detail view of the sliding telescoping connection.

The modern automobile generally has its transmission located beneath the floor boards at a point substantially in the center of the car, and usually adjacent the driver's seat. This requires a long handle extending upwardly for the driver to actuate the gear shift and as the handle is long it necessarily follows that the arc of movement will be long. With our device we have eliminated, through proper leverage, this long movement and at the same time we have re-positioned the gear shift lever in such a way that the floor space is free for access and therefore a person may slide from one side of the car to the other, without hindrance. At the present time in most instances, cars have the shift levers so positioned that it is difficult to slide from one side of the car to the other, therefore our device is a considerable advantage as to this point.

In the accompanying drawings wherein for the purpose of illustration is shown a preferred embodiment of our invention, the numeral 5 designates a shift lever of any standard transmission designated by the numeral 6. This lever is bent forwardly instead of rearwardly as is now common practice. To the upper end of the lever is attached a fitting 7, which fitting has hinged thereto as at 8, a female member 9, the hinge being so positioned that the lever 5 may be moved toward either side of the vehicle. Slidably positioned within the female member 9 is a male member 11 hinged as at 12 to a fitting 13 secured to a sliding rod 14. The hinge 12 has its axis at right angles to the axis of the hinge 8, thus making a universal connection between the rod 14 and the lever 5. The rod 14 extends through a suitable bushing 16 carried in the instrument board 17 and has an upturned end 18 which carries a handle 19, which handle may take the form of the usual ball, commonly employed with shift levers.

When the device is arranged as shown in the figures, the shifting operation is readily accomplished in the customary manner. That is, assuming that a standard gear shift is used and it is desired to go from neutral into low gear, then the handle 19 is moved toward the right so as to rotate the rod 14 and then the handle is pulled toward the operator which will cause the gears to mesh. The rotating of the rod 14 from the neutral position shown in full lines in Fig. 3 to the dotted lines shown in this figure, causes the selecting action, while the in and out movement illustrated in Fig. 4 accomplishes the gear engaging action. The telescoping joint between the male and female members 11 and 12 forms a positive, yet flexible varying connection, which permits the various shifts to be accomplished without any binding action, thus it will be apparent that a very slight movement of the ball 19, first about the axis of the rod 14 and then a slight pull, will accomplish the shifting operation, all of which actions will be materially decreased in amount of movement.

It is to be understood that the form of our invention herewith shown and described is to be taken as a preferred example of the same and that various changes relative to the material, size, shape and arrangement of parts may be resorted to without departing from the spirit of the invention or the scope of the subjoined claims.

Having thus described our invention, we claim:—

1. In a device of the character described, in combination with a transmission having a shift lever, of a fitting secured thereto, a hinge member secured to said fitting, a sliding member engaging said hinge member, said sliding member being hingedly secured to a second fitting, said hinges being at right angles to each other, and a pull rod connected to said second mentioned fitting.

2. In a device of the character described, in combination with a transmission having a shift lever, of a fitting secured thereto, a hinge member secured to said fitting, a sliding member engaging said hinge member, said sliding member being hingedly secured to a second fitting, said hinges being at right angles to each other, a pull rod connected to said second mentioned fitting, and means for moving said rod longitudinally and for rotating said rod about its axis.

In testimony whereof we affix our signatures.

CHARLES S. HADLEY.
ROBERT W. FISCHER.